(12) United States Patent
Nagai et al.

(10) Patent No.: US 11,773,022 B2
(45) Date of Patent: Oct. 3, 2023

(54) MANUFACTURING METHOD OF PLUGGED HONEYCOMB STRUCTURE

(71) Applicant: NGK INSULATORS, LTD., Nagoya (JP)

(72) Inventors: Shungo Nagai, Nagoya (JP); Hiroaki Hayashi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 1104 days.

(21) Appl. No.: 15/874,215

(22) Filed: Jan. 18, 2018

(65) Prior Publication Data
US 2018/0222083 A1 Aug. 9, 2018

(30) Foreign Application Priority Data

Feb. 6, 2017 (JP) .................................. 2017-019219

(51) Int. Cl.
*C04B 26/00* (2006.01)
*C04B 26/04* (2006.01)
(Continued)

(52) U.S. Cl.
CPC .......... *C04B 26/04* (2013.01); *B01D 46/0001* (2013.01); *B28B 11/006* (2013.01);
(Continued)

(58) Field of Classification Search
None
See application file for complete search history.

(56) References Cited

U.S. PATENT DOCUMENTS 5,545,450 A * 8/1996 Andersen .............. B01F 3/1214
428/34.5
6,241,940 B1 6/2001 Beall et al.
(Continued)

FOREIGN PATENT DOCUMENTS

CN 1304389 A 7/2001
CN 1747773 A 3/2006
(Continued)

OTHER PUBLICATIONS

Dickey, David. "Tackling Difficult Mixing Problems." Fluids and Solids Handling, MixTech, Inc. , Aug. 2015, www.aiche.org/sites/default/files/cep/20150835.pdf. / https://web.archive.org/web/20160509032643/https://www.aiche.org/sites/default/files/cep/20150835.pdf (Year: 2015).*

(Continued)

*Primary Examiner* — Alison L Hindenlang
*Assistant Examiner* — Andrés E. Behrens, Jr.
(74) *Attorney, Agent, or Firm* — BURR PATENT LAW, PLLC

(57) ABSTRACT

A manufacturing method of a plugged honeycomb structure including a plugging material preparing step of mixing a ceramic raw material, a pore former, a thickener, an organic binder, a dispersing agent, and water and preparing the plugging material which is slurried, to form the plugging portions, wherein the plugging material preparing step includes: a powder mixing step of mixing the ceramic raw material, the pore former, the organic binder and the dispersing agent each of which is constituted of powder, at predetermined blend ratios, a thickener mixing step of adding and mixing the thickener to a powder mixture obtained by the powder mixing step, and a kneading step of adding the water to a thickener added mixture obtained by the thickener mixing step, to perform kneading.

3 Claims, 3 Drawing Sheets

(51) Int. Cl.
　　　*C04B 38/00*　　　(2006.01)
　　　*C04B 35/00*　　　(2006.01)
　　　*C04B 35/195*　　(2006.01)
　　　*B01D 46/24*　　　(2006.01)
　　　*B01D 46/00*　　　(2022.01)
　　　*F01N 3/00*　　　 (2006.01)
　　　*B28B 11/00*　　　(2006.01)
　　　*C04B 35/626*　　(2006.01)
　　　*B28B 17/02*　　　(2006.01)
　　　*C04B 26/28*　　　(2006.01)
　　　*C04B 35/565*　　(2006.01)
　　　*F01N 3/022*　　　(2006.01)
　　　*C04B 111/00*　　(2006.01)

(52) U.S. Cl.
　　　CPC .......... *B28B 11/007* (2013.01); *B28B 17/026* (2013.01); *C04B 26/285* (2013.01); *C04B 35/195* (2013.01); *C04B 35/565* (2013.01); *C04B 35/62635* (2013.01); *C04B 38/0006* (2013.01); *C04B 38/0012* (2013.01); *B01D 46/24491* (2021.08); *C04B 2111/0081* (2013.01); *C04B 2111/00793* (2013.01); *C04B 2235/3217* (2013.01); *C04B 2235/3218* (2013.01); *C04B 2235/349* (2013.01); *C04B 2235/3418* (2013.01); *C04B 2235/3481* (2013.01); *F01N 3/0222* (2013.01)

(56) References Cited

U.S. PATENT DOCUMENTS

| | | | | |
|---|---|---|---|---|
| 7,517,502 | B2 * | 4/2009 | Ohno | B01J 35/04 |
| | | | | 422/177 |
| 7,556,664 | B2 * | 7/2009 | Ichikawa | B01D 46/0001 |
| | | | | 264/628 |
| 9,327,246 | B2 * | 5/2016 | Teranishi | B01D 46/2425 |
| 10,279,573 | B2 * | 5/2019 | Ishii | C04B 38/0006 |
| 2005/0120691 | A1 | 6/2005 | Miwa | |
| 2006/0029769 | A1 | 2/2006 | Ichikawa et al. | |
| 2006/0062961 | A1 | 3/2006 | Kaneda et al. | |
| 2006/0159602 | A1 | 7/2006 | Ohno et al. | |
| 2009/0098336 | A1 | 4/2009 | Kaneda et al. | |
| 2014/0123612 | A1 | 5/2014 | Yamada et al. | |

FOREIGN PATENT DOCUMENTS

| | | | | |
|---|---|---|---|---|
| CN | 101511749 | * | 7/2007 | ......... C04B 38/0006 |
| DE | 60 2004 011 378 T2 | | 8/2008 | |
| JP | 2003-269132 A1 | | 9/2003 | |
| JP | 2004-154692 A1 | | 6/2004 | |
| JP | 2011-189252 A1 | | 9/2011 | |
| KR | 2005/0051573 | * | 11/2004 | ....... C04B 35/62635 |

OTHER PUBLICATIONS

CN-101,511,749 (Noguchi) Jul. 2007 (online machine translation), [Retrieved on Jan. 5, 2023]. Retrieved from: Espacenet (Year: 2007).*
KR-2005/0,051,573 (Toshio) Nov. 2004 (online machine translation), [Retrieved on Jan. 5, 2022]. Retrieved from: Espacenet (Year: 2004).*
Polyethylene Glycol—Wikipedia. web.archive.org/web/20170128233138/https://en.wikipedia.org/wiki/Polyethylene_glycol. (Year: 2017).*
German Office Action (with English translation), German Application No. 10 2018 000 384.2, dated Feb. 4, 2019 (8 pages).
German Office Action (Application No. 10 2018 000 384.2) dated May 15, 2019 (with English translation).
Chinese Office Action, Chinese Application No. 201 810077530.4, dated Mar. 9, 2021 (8 pages).
Chinese Office Action (with English translation), Chinese Application No. 201810077530.4, dated Sep. 23, 2020 (14 pages).

* cited by examiner

MANUFACTURING METHOD OF PLUGGED HONEYCOMB STRUCTURE

"The present application is an application based on JP-2017-019219 filed on Feb. 6, 2017 with Japan Patent Office, the entire contents of which are incorporated herein by reference."

BACKGROUND OF THE INVENTION

Field of the Invention

The present invention relates to a manufacturing method of a plugged honeycomb structure, and more particularly, it relates to a manufacturing method of a plugged honeycomb structure which is for use in a gasoline particulate filter (GPF), a diesel particulate filter (DPF), or the like and which is capable of trapping and removing particulates of particulate matter or the like.

Description of the Related Art

Heretofore, honeycomb structures made of ceramics have been used in various use applications of a car exhaust gas purifying catalyst carrier, a diesel particulate filter, a heat reservoir for a burning device, and the like. For example, in the diesel particulate filter, there is especially used a honeycomb structure (a plugged honeycomb structure) which is configured to trap particulate matter in an exhaust gas emitted from a diesel engine, and in which one end portion of each of predetermined cells is plugged with a plugging material, whereas the other end portion of each of the residual cells is plugged with the plugging material (see Patent Documents 1 and 2).

The above-plugged honeycomb structure is constituted mainly by using a ceramic material including a cordierite component, a silicon carbide component and the others. Furthermore, development to heighten a porosity of partition walls of a plugged honeycomb structure has been suggested for the purpose of avoiding rise in pressure loss of the plugged honeycomb structure (e.g., see Patent Document 3).

In the case of using the plugged honeycomb structure as a DPF, the plugged honeycomb structure is stored (canned) in a metal case via a cushion material. In this storing step (the canning step), strong pressure (stress) might be applied to a circumferential surface of the plugged honeycomb structure. As a result, a shearing stress is generated in a boundary surface between plugging portions made of a plugging material and partition walls.

At this time, the shearing stress strengthens gradually from the center of the plugged honeycomb structure toward the vicinity of a circumference thereof. When the stress is in excess of a shearing strength of the partition walls, cracks are generated in the boundary surface from the circumference toward the inside of the plugged honeycomb structure, and a defect such as plugging peeling is generated in a corner portion (a peripheral edge portion) of the plugged honeycomb structure. On the other hand, as a result of earnest study, the present applicant has already found that blend components and the like of a plugging material are adjusted to heighten a porosity of plugging portions and that Young's modulus of the plugging portions is adjusted in a constant range to eliminate the above defect.

[Patent Document 1] JP-A-2003-269132
[Patent Document 2] JP-A-2011-189252
[Patent Document 3] JP-A-2004-154692

SUMMARY OF THE INVENTION

However, there has been the possibility that problems described below occur with the heightening of a porosity of plugging portions. Specifically, for the purpose of heightening the porosity of the plugging portions, it is necessary to add a lot of pore former and thickener. Additionally, when such two raw materials are mixed in the form of powder to prepare a plugging material, there is the tendency that large agglomerates (so-called "lumps") are easily formed, and a lot of agglomerates might be present in the prepared plugging material.

Here, a plugging portion forming step of forming the plugging portions is mainly performed by utilizing "a squeegee system". For example, as shown in FIG. 4, a film 102 is attached to an upper end face 101 of a honeycomb formed body 100 which is fixed by using a chuck 107 prior to firing, and positions of the film 102 which correspond to arrangement conditions of plugging portions (e.g., "a checkerboard pattern", etc.) are irradiated with laser, to form a plurality of pores 103 in the film 102.

Afterward, there is performed an operation of disposing, on the film 102, a slurried plugging material 104 whose viscosity or the like is beforehand adjusted, and moving a squeegee 105 along the film 102 in a horizontal direction (see arrows in FIG. 4). Consequently, a constant amount of the plugging material 104 is charged into cells 106 opened at positions which face the pores 103 of the film 102. Then, the film 102 is peeled, and then the whole honeycomb formed body 100 is dried, thereby drying the plugging material 104 charged in the cells 106, to form the plugging portions (not shown). A plugging depth varies in accordance with the number of times of the moving operation of the squeegee 105, a contact angle between the squeegee 105 and the film 102, pressing pressure of the squeegee 105 onto the film 102, the viscosity of the salaried plugging material 104, and the likes.

Except for the above "squeegee system", there is occasionally performed "a press-in system" of immersing one end of a honeycomb formed body to which a film is attached and in which pores are formed, into a liquid tank in which a slurried plugging material is stored, to charge the plugging material into the cells. In this case, a plugging depth varies in accordance with an amount of the plugging material to be stored in the liquid tank, i.e., a depth in which the honeycomb formed body is immersed into the plugging material.

In the plugging portion forming step, when a lot of agglomerates are present in the plugging material, the plugging material is not uniformly charged into the cells, and there occurs the defect that the plugging depth locally becomes non-uniform. Here, the plugging depth is usually set to, for example, a length of about 2 to 10 mm from an end face of the honeycomb formed body.

As already described, it has been necessary to increase addition ratios of the pore former and the thickener for the purpose of heightening the porosity of the plugging portions. However, due to the increase of the addition ratios of the pore former and the thickener, an amount of the agglomerates to be generated increases, and the plugging depth becomes non-uniform. Therefore, the increase of the addition ratios is contradictory to the high porosity of the plugging portions. Here, when the plugging depth is non-uniform, particulates (e.g., metal particulates) included in an exhaust gas come in contact with portions having a small plugging depth, and erosion is likely to occur. As a result, the erosion weakens close contact properties between the plugging portions and the cells, and finally there is the fear that the plugging portions drop out from the cells. Consequently, there has been the possibility that a trapping performance of the particulates and the like by the plugged honeycomb structure remarkably deteriorates.

To eliminate the above defect, the present applicant has found out a technique of using a plugging material which is capable of heightening a porosity of plugging portions, and optimizing preparation conditions, for example, in kneading the plugging material, to inhibit generation of agglomerates and to uniformize a plugging depth.

In consequence, the present invention has been developed in view of the above actual situations, and an object thereof is to provide a manufacturing method of a plugged honeycomb structure which is capable of heightening a porosity of plugging portions and achieving a uniform plugging depth.

According to the present invention, there is provided a manufacturing method of a plugged honeycomb structure to achieve the above object.

According to a first aspect of the present invention, a manufacturing method of a plugged honeycomb structure is provided having a plurality of cells defined by partition walls and forming through channels for a fluid, and plugging portions arranged to plug one of end portions of each of predetermined cells with a plugging material and plug the other end portion of each of the residual cells with the plugging material, in accordance with a prescribed arrangement standard, the manufacturing method including a plugging material preparing step of mixing a ceramic raw material, a pore former, a thickener, an organic binder, a dispersing agent, and water and preparing the plugging material which is slurried, to form the plugging portions, wherein the plugging material preparing step includes a powder mixing step of mixing the ceramic raw material, the pore former, the organic binder and the dispersing agent each of which is constituted of powder, at predetermined blend ratios, a thickener mixing step of adding and mixing the thickener to a powder mixture obtained by the powder mixing step, and a kneading step of adding the water to a thickener added mixture obtained by the thickener mixing step, to perform kneading.

According to a second aspect of the present invention, the manufacturing method of the plugged honeycomb structure according to the above first aspect is provided, wherein in the thickener mixing step, a total number of stirring revolutions of the powder mixture and the thickener is set to 500 or less.

According to a third aspect of the present invention, the manufacturing method of the plugged honeycomb structure according to the above first or second aspects is provided, wherein in the thickener mixing step, time of contact between the powder mixture and the thickener is set to 2 minutes or less.

According to a fourth aspect of the present invention, the manufacturing method of the plugged honeycomb structure according to any one of the above first to third aspects is provided, wherein the pore former is added at a ratio of 5 mass % to 30 mass % to a total mass of the ceramic raw material, and the thickener is added at a ratio of 0.4 mass % to 5 mass % to the total mass of the ceramic raw material.

According to a fifth aspect of the present invention, the manufacturing method of the plugged honeycomb structure according to any one of the above first to fourth aspects is provided, wherein a porosity of the plugging portions is in a range of 70% to 90%.

According to a manufacturing method of a plugged honeycomb structure of the present invention, it is possible to manufacture the plugged honeycomb structure which does not have any deviations in a plugging depth, and it is possible to lower the possibility that plugging portions drop out from cells.

DESCRIPTION OF THE PREFERRED EMBODIMENTS

Hereinafter, description will be made as to an embodiment of a manufacturing method of a plugged honeycomb structure of the present invention in detail with reference to the drawings. It is to be noted that the manufacturing method of the plugged honeycomb structure of the present embodiment is not limited to the following embodiment, and various design changes, modifications, improvements and the like are addable without departing from the gist of the present invention.

1. Plugged Honeycomb Structure

Figure 1:
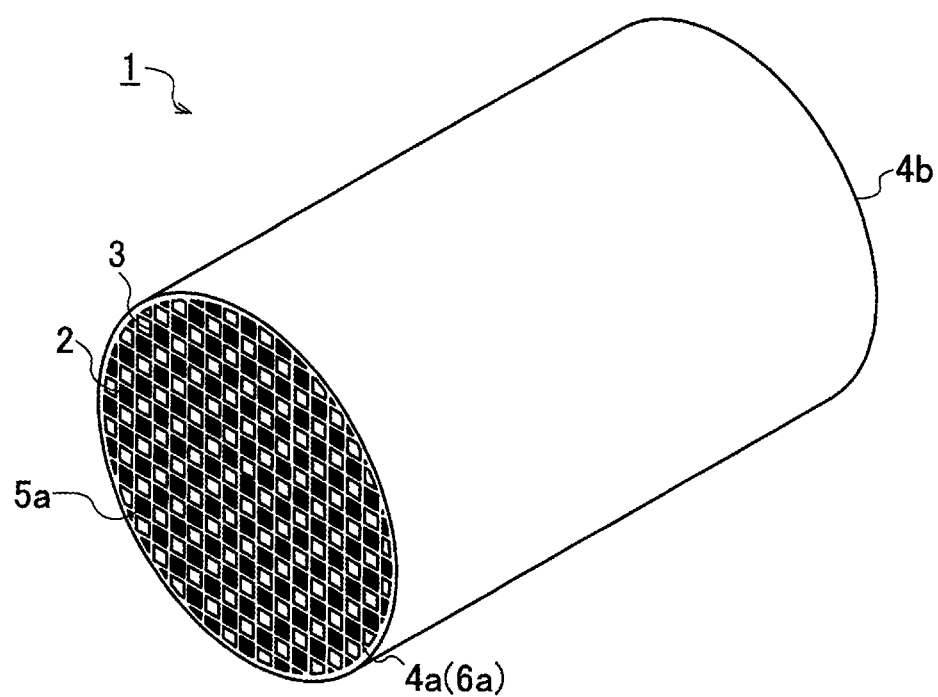
FIG. 1 is a perspective view schematically showing one example of a plugged honeycomb structure.
Figure 2:
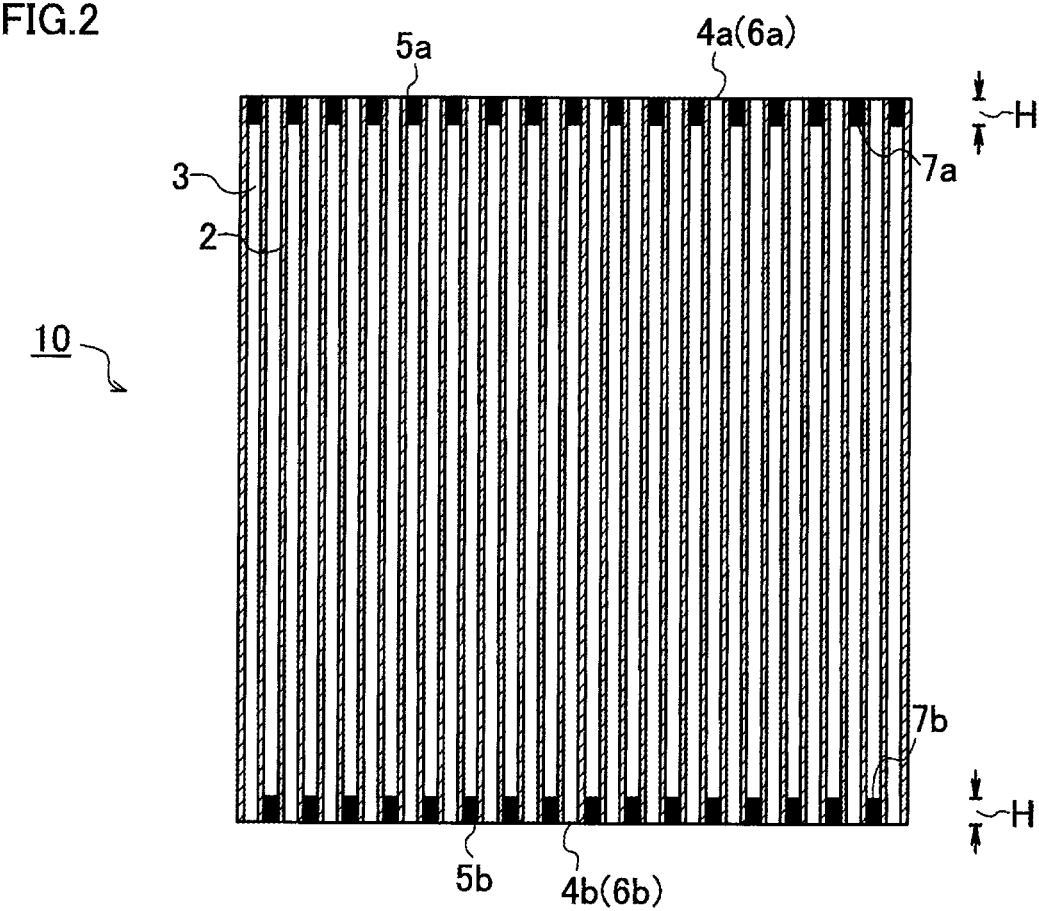
FIG. 2 is a cross-sectional view schematically showing one example of the plugged honeycomb structure.

As shown in FIG. 1 and FIG. 2, a plugged honeycomb structure 1 manufactured by a manufacturing method of the plugged honeycomb structure of the present embodiment (hereinafter referred to simply as "the manufacturing method") includes a plurality of cells 3 defined by latticed partition walls 2 made of porous ceramics and forming through channels for a fluid, a plurality of plugging portions 5a arranged to plug one end portion 4a of each of the predetermined cells 3 with a plugging material, and a plurality of plugging portions 5b arranged to plug the other end portion 4b of each of the residual cells 3 with the plugging material.

Here, the plugged honeycomb structure 1 is mainly for use as a filter member such as a gasoline particulate filter (GPF) or a diesel particulate filter (DPF), and in the latticed partition walls 2 constituting the plugged honeycomb structure 1, a material made of porous ceramics, e.g., cordierite or SiC is usable. Consequently, it is possible to construct the plugged honeycomb structure 1 which exerts low pressure loss properties.

It is to be noted that a shape of the plugged honeycomb structure 1 is not especially limited to a substantially round pillar shape shown in FIG. 1 or the like, and may be any shape such as a polygonal pillar shape or an elliptic pillar shape. Furthermore, a cross-sectional shape of the cells 3 defined as the through channels for the fluid is not limited to such a square shape as described above, and may be a polygonal shape such as a hexagonal shape or an octagonal shape or any combination of a quadrangular shape and the octagonal shape.

Furthermore, there are not any special restrictions on, for example, a cell density of the cells 3 defined by the partition walls made of cordierite or a partition wall thickness of the partition walls 2, and optional values are employable. For example, the cell density is from 85 to 600 cpsi (from 13 to 93 cells/cm$^2$), and the partition wall thickness is from 4 to 25 mil (from 0.10 to 0.64 mm). Here, "cpsi (cells per square inch)" indicates the number of the cells 3 to be included in an area of 1 square inch.

As shown in FIG. 1 or the like, the plugged honeycomb structure 1 includes the cells 3 which are opened in one end portion 4a and the other end portion 4b, respectively, and the slurried plugging material is charged from the end portions 4a and 4b into the cells 3, so that it is possible to form plugging portions 5a and 5b with which the cells 3 are plugged.

Here, in a forming method of the plugging portions 5a and 5b by use of the slurried plugging material, "a squeegee system" or "a press-in system" already described above or the like is usable. In the present embodiment, the plugging portions 5a and 5b are formed in the respective end portions 4a and 4b in accordance with an arrangement standard to alternately plug the cells 3, and the plugging portions possess such a checkerboard pattern as shown in FIG. 1. There are not any special restrictions on the arrangement standard of the plugging portions 5a and 5b, and an optional arrangement standard is usable.

Figure 3:
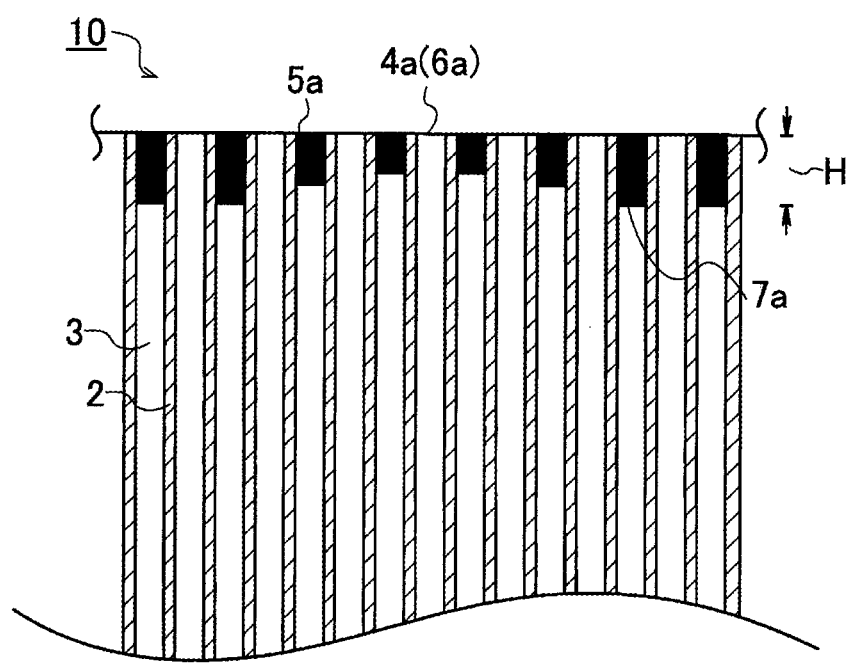
FIG. 3 is a partially enlarged cross-sectional view showing one example of the plugged honeycomb structure which has deviations in a plugging depth.
Figure 4:
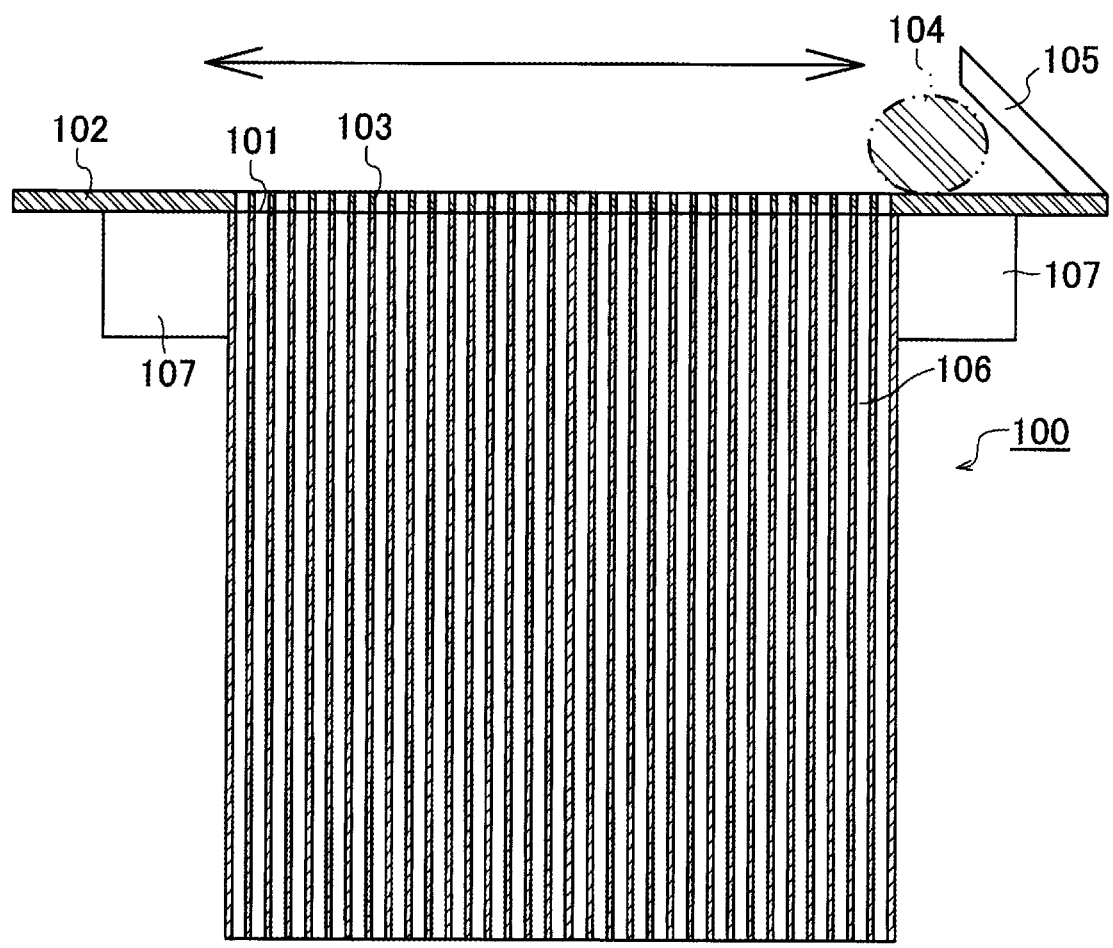
FIG. 4 is an explanatory view schematically showing one example of a forming method of plugging portions by a squeegee system.

In the plugged honeycomb structure 1 manufactured by the manufacturing method of the present embodiment, a length from the end portion 4a or 4b of each cell 3, i.e., one end face 6a or the other end face 6b of the plugged honeycomb structure 1 to one end 7a or 7b of each plugging portion is defined as "a plugging depth H" (see FIG. 2). Here, when agglomerates such as lumps are present in the plugging material for use, deviations might be generated in the plugging depth H of each of the plugging portions 5a and 5b as shown in FIG. 3.

2. Manufacturing Method of Plugged Honeycomb Structure

Hereinafter, description will be made as to manufacturing of the plugged honeycomb structure 1 by use of the manufacturing method according to one embodiment of the present invention, in detail. Here, in the manufacturing method of the present embodiment, detailed description as to well-known steps and the like are omitted. Specifically, there are well known a forming step of preparing a forming material and extruding a honeycomb formed body 10 in the form of a honeycomb, a drying step of drying the honeycomb formed body 10, a cutting step of cutting the honeycomb formed body into a desirable shape, a firing step of firing the honeycomb formed body 10 further provided with the plugging portions 5a and 5b at a predetermined firing temperature (e.g., 1400° C. or more) for a long time, and the like, and hence the detailed descriptions are omitted.

Therefore, description will be made as to a step of arranging the plurality of plugging portions 5a and 5b in the end portions 4a and 4b of the cells 3 of the extruded honeycomb formed body 10 especially in detail. It is to be noted that in the plugged honeycomb structure 1 and the honeycomb formed body 10, respective constitutions of the cells 3 and others are denoted with the same reference numerals.

The manufacturing method of the present embodiment is configured to manufacture the plugged honeycomb structure 1, and includes a plugging material preparing step of mixing and kneading a ceramic raw material, a pore former, a thickener, an organic binder, a dispersing agent, and water which are raw materials of the plugging material, to prepare the plugging material which is slurried.

Here, the plugging material preparing step includes a powder mixing step of mixing the ceramic raw material, the pore former, the organic binder and the dispersing agent each of which is constituted of powder, at predetermined blend ratios, to obtain a powder mixture, a thickener mixing step of adding and mixing the thickener constituted of the powder to the obtained powder mixture, to obtain a thickener added mixture, and a kneading step of adding the water to the obtained thickener added mixture to perform kneading. In other words, to prepare the slurried plugging material in the material method of the present embodiment, the raw materials excluding the thickener and water are mixed in the form of the powder, the thickener of the powder is further added, and then water is further added, thereby performing the kneading.

As described above, the pore former and the thickener have properties of comparatively easily generating the agglomerates (the lumps). Therefore, when the pore former and the thickener, each of which is constituted of the powder, are present together continues over a long time, an agglomerated region of these components is often easily generated in the prepared slurried plugging material.

Consequently, in the manufacturing method of the present embodiment, as a means for eliminating the above defect, the powder of the raw materials other than the thickener and water is beforehand uniformly mixed, and then the thickener is further added, thereby mixing the materials. Specifically, in a first stage, there is performed a step of mixing the powder of the materials other than the thickener to completely uniformly disperse the powder (the powder mixing step), and further in a second stage, there is performed a step of adding and mixing the thickener to the powder mixture (the thickener mixing step). Then, in a third stage, a step of adding water to prepare the plugging material in a predetermined viscosity (a kneading step) is performed.

The ceramic raw material may be the same as a material which is considered to be the forming material in forming the after-mentioned honeycomb formed body 10. Furthermore, the pore former, the organic binder, the dispersing agent and others may similarly be the same as those for use in forming the honeycomb formed body.

Examples of the ceramic raw material include talc, alumina, aluminum hydroxide, kaolin, and silica, examples of the pore former include graphite, foamable resin, flour, starch, phenol resin, polyethylene terephthalate, Shirasu balloon, and fly ash balloon, and an example of the thickener is polyethylene oxide.

Furthermore, examples of the organic binder include methylcellulose, hydroxypropoxyl methylcellulose, hydroxypropyl methylcellulose, hydroxyethyl cellulose, carboxymethylcellulose, and polyvinyl alcohol, and examples of the dispersing agent include ethylene glycol, dextrin, fatty acid soap, and polyalcohol. It is to be noted that as the water, usual purified water, deionized water or the like is usable.

In the thickener mixing step, for the purpose of inhibiting agglomeration of the pore former and the thickener, a total number of stirring revolutions in a state where both of them are in the form of the powder is limited. The total number of the stirring revolutions of the pore former and the thickener is set to 500 or less, and hence the possibility of generating the agglomerates in the slurried plugging material is suppressed.

The thickener mixing step is performed so that time of contact between the powder mixture obtained by the powder mixing step and the thickener is set to 2 minutes or less in the same manner as in the limiting of the total number of the stirring revolutions. Specifically, the time of the contact between the pore former of the powder included in the powder mixture and the thickener is shortened as much as possible. Consequently, it is possible to prevent the agglomeration of the pore former and the thickener.

Here, an addition ratio of the pore former in the powder mixing step is set to a range of 5 mass % to 30 mass % to a total mass of the ceramic raw material. Furthermore, an addition ratio of the thickener in the thickener mixing step is similarly set to a range of 0.4 mass % to 5 mass % to the total mass of the ceramic raw material. Consequently, it is possible to prepare the plugging material in which any agglomerates are not generated.

When the addition ratios of the pore former and the thickener deviate from the above ranges, there is the possibility that the agglomerates are easily generated in the plugging material and that a porosity of the plugging portions 5a and 5b in which the plugging material is used deviates from a prescribed range. In the manufacturing method of the present embodiment, the porosity in the plugging portions 5a and 5b of the obtained plugged honeycomb structure 1 is adjusted in a range of 70% to 90%.

There is performed a plugging portion forming step of arranging the plugging portions 5a and 5b to the plurality of cells 3 of the extruded honeycomb formed body 10 by use of the slurried plugging material prepared as described above. It is to be noted that the plugging portions 5a and 5b are formed by the above-mentioned "squeegee system" or "press-in system". Consequently, it is possible to comparatively simply constitute the plugged honeycomb structure 1 including the plugging portions 5a and 5b which have a high porosity and which are formed by charging the plugging material to a predetermined depth (the plugging depth H) from the end portion 4a or 4b of each cell 3.

According to the manufacturing method of the present embodiment, the number of times of the contact between the pore former and the thickener is decreased as much as possible, so that the agglomerates (the lumps) are not generated in the slurried plugging material. Consequently, in the plugging portion forming step of the squeegee system or the like, an amount of the plugging material to be charged into the end portions 4a and 4b of the cells 3 is not uneven. Therefore, a length (a distance) from the end face 6a or 6b to the one end 7a or 7b of the plugging portion is not locally uneven. In consequence, any deviations are not generated in the plugging depth H.

The plugging material is charged to the cells 3 in accordance with a prescribed arrangement standard, and then the honeycomb formed body 10 is dried at a drying temperature of, for example, 80 to 250° C. for 3 minutes to about 2 hours. Afterward, the dried honeycomb formed body 10 is fired on predetermined firing conditions, thereby completing the plugged honeycomb structure 1 according to the manufacturing method of the present embodiment. The plugging depths H of the respective plugging portions 5a and 5b are uniform, and hence it is possible to prevent the plugging portions 5a and 5b from dropping out from the cells 3.

Hereinafter, description will be made as to examples of the manufacturing method of the plugged honeycomb structure of the present invention. However, the manufacturing method of the plugged honeycomb structure of the present invention is not especially restricted by these examples.

EXAMPLES (1) Preparation of Plugging Material (Relation Between Addition Ratio of Pore Former and Thickener and Porosity)

For the purpose of improving a difference in rigidity between plugging portions and a honeycomb formed body, a plugging material was improved to heighten a porosity of the plugging portions. Specifically, improved plugging materials A and B were prepared by setting addition ratios of a pore former and a thickener included in the plugging material to be higher than those of a conventional plugging material, and porosities of the plugging portions formed by using these materials were measured. Table 1 mentioned below shows the addition ratios of the pore former and the thickener, and the measured porosities of the plugging portions.

At this time, a commercially available mixer (Kanto Mixer HP-90L manufactured by Kanto Kongoki Industrial Co., Ltd.) was used on preparation conditions of the plugging material, a ceramic raw material that was a main raw material, a thickener, a pore former, an organic binder and others were thrown into the mixer, a revolution speed of a stirring blade (a hook type) was set to 136 rpm to mix powder for 20 minutes, water and a dispersing agent were then thrown into the mixer, and these materials were further kneaded at 136 rpm for 40 minutes.

In this table, the addition ratios of the pore former and the thickener indicate ratios (weight ratios) of amounts of the pore former and the thickener to be added, when a total mass of the ceramic raw material is 100. The plugging portions were formed from the respective prepared slurried plugging materials, and the porosities of the obtained plugging portions were measured. The porosities of the plugging portions were measured by suitably using a heretofore well-known measuring technique, e.g., mercury porosimetry or Archimedes' method.

TABLE 1

|  | Improved plugging material A | Improved plugging material B | Conventional material |
| --- | --- | --- | --- |
| Addition ratio of pore former/% | 21.0 | 21.0 | 5.0 |
| Addition ratio of thickener/% | 0.4 | 1.0 | 0.2 |
| Porosity/% | 81.0 | 79.2 | 65.0 |

As shown in Table 1, it has been confirmed that in each of an improved plugging material A and an improved plugging material B in which addition ratios of a pore former and a thickener are set to be higher than those of a conventional plugging material, porosities of plugging portions heighten. Specifically, a porosity of the conventional material is 65%, whereas the improved plugging material A or B indicates a high porosity value of 79% or more.

However, it has simultaneously been confirmed that a lot of agglomerates are present in a slurried plugging material on conventional plugging material preparation conditions. Therefore, attempts were made to optimize the preparation conditions of the plugging material for the purpose of inhibiting generation of the agglomerates in the plugging material.

(2) Optimization of Preparation Conditions of Plugging Material

To inhibit the generation of the agglomerates, powder of each of raw materials (the pore former, the ceramic raw material, etc.) of the plugging material excluding the thickener was mixed, and then the thickener was finally added. In this case, when a total mixing time was set to 10 minutes, mixing was performed in a state where the thickener was not added for 8 minutes (a powder mixing step), and the thickener was added to a powder mixture obtained by this step to further perform mixing for 2 minutes (a thickener mixing step).

Furthermore, there was performed a kneading step of adding water to a thickener added mixture obtained by the thickener mixing step to perform kneading. At this time, a revolution speed of the mixer was set to 136 rpm. Furthermore, after adding the water, the kneading step was performed for 40 minutes. Example 1 had these preparation conditions.

For the comparison with the above preparation conditions, preparation was performed on preparation conditions that all raw materials (including a thickener) were thrown into a mixer and mixed for 5 minutes, and then water was added to perform a kneading step for 40 minutes (Comparative Example 1), and preparation was performed on preparation conditions that all raw materials were thrown into a mixer and mixed for 20 minutes, and then water was added to perform a kneading step for 40 minutes (Comparative Example 2). Plugging materials obtained on the respective preparation conditions (Example 1 and Comparative Examples 1 and 2) were visually confirmed, and presence/absence of agglomerates was evaluated.

Here, in a method of detecting the agglomerates, the slurried plugging material, to which blue color powder was added to easily grasp an agglomerated state, was sampled, passed through a 420 µm mesh screen, and sandwiched between a pair of transparent sheets, and the transparent sheets were brought into contact closely with each other, to judge whether or not white foreign matter (the agglomerates) was present.

The example where the presence of the agglomerates was not confirmed was evaluated as "none", and the example where the agglomerates were confirmed was evaluated as "present". Table 2 mentioned below shows time of contact between the pore former and the thickener, a flow of the preparation of the plugging material, and the evaluation result of the agglomerates. Additionally, the foreign matter (the agglomerates) was observed with a scanning electron microscope (SEM) and it was confirmed that the agglomerates were constituted of the pore former and the thickener.

TABLE 2

| | Example 1 | Comparative Example 1 | Comparative Example 2 |
|---|---|---|---|
| Time of contact between pore former and thickener/min. | 2 | 5 | 20 |
| Flow of preparation of plugging material | Throw raw materials other than thickener<br>Mixing (8 min.)<br>Addition of thickener ↓<br>Mixing (2 min.) ↓<br>Addition of water<br>Kneading (40 min.) | Throw all raw materials<br>Mixing (5 min.)<br>↓<br>↓<br>Addition of water<br>Kneading (40 min.) | Throw all raw materials<br>Mixing (20 min.)<br>↓<br>↓<br>Addition of water<br>Kneading (40 min.) |
| Presence/absence of agglomerates | None | Present | Present |

As shown in Table 2 mentioned above, in Example 1 where the time of the contact between the pore former and the thickener was suppressed to 2 minutes or less, the presence of the agglomerates was hardly confirmed in the slurried plugging material. Specifically, as described in the manufacturing method of the present embodiment, a timing to throw the thickener into the mixer is appropriately controlled, so that it is possible to remarkably inhibit the generation of the agglomerates in the plugging material. As a result, in plugging of cells by use of such a plugging material, the defect that a plugging depth of each plugging portion is locally uneven does not occur.

(3) Relation Between Presence/Absence of Agglomerates and Total Number of Stirring Revolutions Furthermore, it has been confirmed that in the above powder mixing step and thickener mixing step, the time of the contact between the pore former and the thickener is limited to a predetermined time or less, and in these mixing steps, the number of stirring times of the stirring blade (a total number of stirring revolutions) is suppressed, to inhibit the generation of the agglomerates.

In the mixer (manufactured by Kanto Kongoki Industrial Co., Ltd.) used in the present embodiment, it is possible to revolve the stirring blade at a first speed (136 rpm) and a second speed (248 rpm). Table 3 mentioned below shows a summary of the total number of the stirring revolutions of the pore former and the thickener by use of this mixer and the presence/absence of the generation of the agglomerates.

TABLE 3

| | Example 2 | Example 3 | Example 4 | Comparative Example 3 | Comparative Example 4 | Comparative Example 5 | Comparative Example 6 | Comparative Example 7 | Comparative Example 8 |
|---|---|---|---|---|---|---|---|---|---|
| Total number of stirring revolutions/revolutions | 272 | 496 | 248 | 0 | 744 | 680 | 1240 | 1360 | 2720 |
| Time of contact between pore former and thickener/min. | 2 | 2 | 1 | 0 | 3 | 5 | 5 | 10 | 20 |

TABLE 3-continued

|  | Example 2 | Example 3 | Example 4 | Comparative Example 3 | Comparative Example 4 | Comparative Example 5 | Comparative Example 6 | Comparative Example 7 | Comparative Example 8 |
|---|---|---|---|---|---|---|---|---|---|
| Revolution speed/rpm | 136 | 248 | 248 | — | 248 | 136 | 248 | 136 | 136 |
| Presence/absence of agglomerates | None | None | None | None | Present | Present | Present | Present | Present |

As shown in Table 3 mentioned above, it has been confirmed that when the total number of the stirring revolutions is limited to 500 or less and the time of the contact between the pore former and the thickener is suppressed to 2 minutes or less, any agglomerates are not generated. On the other hand, when the total number of the stirring revolutions is 0 and water is directly thrown into the mixer in a state where the thickener is not sufficiently mixed, an undissolved thickener occasionally remains, and hence such an example is not applicable. It is to be noted that the undissolved thickener does not develop a white color, and therefore cannot be confirmed by a current judging method, and hence the table shows the agglomerates as "none".

(4) Evaluation of Plugging Depth (4-1) Evaluation by Light Transmission Method

Plugging portions were formed on the side of one end face of a honeycomb formed body by use of plugging materials (Example 1 and Comparative Example 2) prepared in the above (2). Here, the plugging portions were formed by employing an already described squeegee system, and conditions (squeegee conditions, etc.) other than conditions of the plugging materials were the same in the examples. As to a honeycomb formed body having the obtained plugging portions, a defect of a plugging depth was judged by a light transmission method.

Here, in the light transmission method, the other end face of the honeycomb formed body is irradiated with light, and a transmission degree of the light is confirmed from the one end face. That is, in a region having a small plugging depth, the plugging portions transmit the irradiated light, and hence contrast with the surrounding brightens. On the other hand, when the plugging depth is sufficient, the irradiated light is blocked by the plugging portions, and the contrast darkens. It is to be noted that in the present embodiment, when the plugging depth is 2 mm or more, the irradiated light is completely blocked by the plugging portions. Therefore, it is considered that the plugging portions having a plugging depth smaller than 2 mm are defective. For the purpose of carrying out the evaluation by the light transmission method, a light leakage inspection device is used. Here, the light leakage inspection device includes a transparent plate which is disposed in a dark place surrounded with a thick cloth such as a curtain and on which the honeycomb formed body of a measurement target can be mounted, and light (a light source) with which the transparent plate can be irradiated from the downside toward the upside. Such a light leakage inspection device was used, the honeycomb formed body was illuminated with light from the downside, and each end face of the honeycomb formed body was visually confirmed. At this time, for the purpose of easily recognizing contrast in the end face, a tubular member having both open ends was used, and confirmation was performed while attaching the tubular member to the end face of the honeycomb formed body. Additionally, a 500 W light bulb was used as the light source and was connected to a power source having a voltage of 100 V, to carry out the evaluation by the above light transmission method.

Table 4 mentioned below shows a summary of the number of the plugging portions to be evaluated (an evaluation number), the number of the plugging portions judged to be defective in light transmission (the number of defects in the transmission judgment), and a defect ratio (=the number of the defects in the transmission judgment/the evaluation number×100%) as to samples A, B, C, D, and E of the honeycomb formed body in which the plugging material of Example 1 was used. Table 4 similarly shows a summary as to samples F, G, H, I, and J of the honeycomb formed body in which the plugging material of Comparative Example 2 was used.

TABLE 4

|  | Contact time/min. | Sample | Evaluation number | Number of defects in transmission judgment | Defect ratio/% |
|---|---|---|---|---|---|
| Example 1 | 2 | A | 70 | 0 | 0 |
|  |  | B | 30 | 0 | 0 |
|  |  | C | 51 | 0 | 0 |
|  |  | D | 102 | 0 | 0 |
|  |  | E | 73 | 0 | 0 |
| Comparative Example 2 | 20 | F | 64 | 16 | 25 |
|  |  | G | 82 | 23 | 28 |
|  |  | H | 150 | 58 | 39 |
|  |  | I | 50 | 25 | 50 |
|  |  | J | 50 | 15 | 30 |

As shown in Table 4 mentioned above, in Example 1 where the time of contact between a pore former and a thickener was suppressed to 2 minutes or less, each of sample A and others had a defect ratio of 0%. That is, when plugging portions are arranged by using a plugging material of Example 1, a plugging depth can be 2 mm or less.

In this example, generation of agglomerates was inhibited in a process of preparing the plugging material, and an obstructing factor in charging the plugging material into cells was not produced. Therefore, the plugging material was suitably charged into the cells, and the plugging depth had a constant value or more and did not locally deviate. In consequence, it is possible to arrange the plugging portions in which a sufficient plugging depth is acquired, and it is possible to prevent a defect such as dropout of the plugging portions from the cells due to erosion or the like.

On the other hand, Comparative Example 2 where a contact time was set to 20 minutes indicated a high defect ratio value of 25 to 50%. Specifically, a lot of agglomerates were present in a plugging material of Comparative Example 2 and hence suitable charging of the plugging material into cells was obstructed by the agglomerates. As a result, there occurred the defect that a plugging depth of parts of the plugging portions locally decreased.

(4-2) Evaluation by X-Ray CT

The plugging portions were formed in a honeycomb formed body by use of the plugging materials of Example 1 and Comparative Example 2 on conditions that the plugging depth was 5 mm. Each obtained honeycomb formed body was photographed with X-ray CT, and values of plugging depths of a plurality of regions were measured from a photographed image. The number (N) of measurement samples to be measured was set to 3185 in each example. Table 5 mentioned below shows a summary of an average value, a maximum value and a minimum value of the plugging depths which were obtained from the measurement results. To carry out an evaluation by the X-ray CT, an X-ray inspection device (inspeXio SMX-225CT FPD manufactured by Shimadzu Corporation) was used. By use of this X-ray inspection device, a cross-sectional image of the honeycomb formed body was photographed, and each plugging depth was measured from the obtained cross-sectional image. At this time, in the photographing of the cross-sectional image, the vicinity of each plugging portion was photographed at an interval of 0.15 mm along a height direction (an axial direction) of the honeycomb formed body. Furthermore, data of the photographed cross-sectional image was analyzed by using analysis software attached to the X-ray inspection device.

TABLE 5

|  |  | Example 1 | Comparative Example 2 |
|---|---|---|---|
| Time of contact between pore former and thickener/min. | | 2 | 20 |
| Plugging depth | No. of measurement samples | 3185 | 3185 |
| | Average value/mm | 4.95 | 5.05 |
| | Maximum value/mm | 5.35 | 5.40 |
| | Minimum value/mm | 4.30 | 1.20 |

As shown in Table 5 mentioned above, it has been confirmed that when the plugging material of Example 1 is used, especially a minimum value of the plugging depth is remarkably different from that of the plugging material of Comparative Example 2. Specifically, the minimum value of the plugging depth is 1.20 mm in Comparative Example 2, whereas the minimum value of the plugging depth is 4.30 mm in Example 1. Consequently, it has been confirmed that a sufficient plugging depth can be acquired in Example 1.

As described above, according to the manufacturing method of the present invention, for the purpose of avoiding the agglomeration of the pore former and the thickener in the plugging material preparing step of preparing the plugging material, the raw materials other than the thickener are mixed in the form of the powder in the first stage, and then the thickener is added. Consequently, it is possible to inhibit the generation of the agglomerates (the lumps) in the plugging material. As a result, the suitable charging of the plugging material into the cells is not obstructed by the agglomerates in the case of forming the plugging portions.

In particular, the total number of the stirring revolutions of the pore former and the thickener in the thickener mixing step after the thickener is added is suppressed to 500 or less, and the time of the contact between the pore former and the thickener is suppressed to 2 minutes or less, so that it is possible to prevent the contact between the pore former and the thickener which is more than necessary. As a result, the generation of the agglomerates due to the contact between the pore former and the thickener is inhibited, and the plugging material is suitably charged into the cells. In consequence, the plugging depth does not locally become non-uniform.

A manufacturing method of a plugged honeycomb structure of the present invention is especially suitably utilizable in manufacturing the plugged honeycomb structure having high-porosity plugging portions.

DESCRIPTION OF REFERENCE NUMERALS

1: plugged honeycomb structure, 2: partition wall, 3 and 106: cell, 4a: one end portion, 4b: the other end portion, 5a and 5b: plugging portion, 6a: one end face, 6b: the other end face, 7a and 7b: one end of the plugging portion, 10 and 100: honeycomb formed body, 101: end face, 102: film, 103: pore, 104: plugging material, 105: squeegee, 107: chuck, and H: plugging depth.

What is claimed is:

1. A manufacturing method of a plugged honeycomb structure having a plurality of cells defined by partition walls and forming through channels for a fluid, and plugging portions arranged to plug one of end portions of each of predetermined cells with a plugging material and plug the other end portion of each of residual cells with the plugging material, in accordance with a prescribed arrangement standard, the manufacturing method comprising a plugging material preparing step of mixing a ceramic raw material, a pore former, a thickener, an organic binder, a dispersing agent, and water and preparing the plugging material which is slurried, to form the plugging portions, wherein the plugging material preparing step comprises: a powder mixing step of mixing the ceramic raw material, the pore former, the organic binder and the dispersing agent each of which is constituted of powder, at predetermined blend ratios, a thickener mixing step of adding and mixing the thickener to a powder mixture obtained by the powder mixing step, and a kneading step of adding the water to a thickener added mixture obtained by the thickener mixing step, to perform kneading, wherein in the thickener mixing step, a total number of stirring revolutions of the powder mixture and the thickener is set to 500 times or less, and Page 2 of 8 the powder mixture and the thickener are in contact for 2 minutes or less during the thickener mixing step, wherein the thickener is polyethylene oxide.

2. The manufacturing method of the plugged honeycomb structure according to claim 1,
wherein the pore former is added at a ratio of 5 mass % to 30 mass % to a total mass of the ceramic raw material, and
the thickener is added at a ratio of 0.4 mass % to 5 mass % to the total mass of the ceramic raw material.

3. The manufacturing method of the plugged honeycomb structure according to claim 1,
wherein a porosity of the plugging portions is in a range of 70% to 90%.

* * * * *